United States Patent [19]
Farwaha et al.

[11] Patent Number: 5,399,617
[45] Date of Patent: Mar. 21, 1995

[54] THERMOPLASTIC, AQUEOUS LATEX PAINTS HAVING IMPROVED WET ADHESION AND FREEZE-THAW STABILITY

[75] Inventors: Rajeev Farwaha, Brampton; William Currie, Elmira, both of Canada

[73] Assignee: National Starch and Chemical Investment Holding Corporation, Wilmington, Del.

[21] Appl. No.: 207,579

[22] Filed: Mar. 7, 1994

Related U.S. Application Data

[60] Continuation-in-part of Ser. No. 64,682, May 20, 1993, abandoned, which is a continuation-in-part of Ser. No. 748,714, Aug. 22, 1991, abandoned, which is a division of Ser. No. 537,711, Jun. 13, 1990, Pat. No. 5,064,888.

[51] Int. Cl.$^6$ .............................................. C08L 55/00
[52] U.S. Cl. ..................................... 524/815; 524/555
[58] Field of Search ............... 524/157, 238, 815, 555, 524/556, 558, 560

[56] References Cited

U.S. PATENT DOCUMENTS

| | | | |
|---|---|---|---|
| 4,140,664 | 2/1979 | Mizuguchi et al. | 524/602 |
| 4,423,199 | 12/1983 | Chang et al. | 526/307.6 |
| 4,529,762 | 7/1985 | Hoefer et al. | 524/157 |

OTHER PUBLICATIONS

G. P. A. Turner, *Intro. to Paint Chemistry* pp. 142–149, Chapman & Hall, New York, 1988.

*Primary Examiner*—Joseph L. Schofer
*Assistant Examiner*—Jeffrey Smith
*Attorney, Agent, or Firm*—Edwin M. Szala; William K. Wissing

[57] ABSTRACT

Copolymerizable amphoteric surfactants of the structural formula

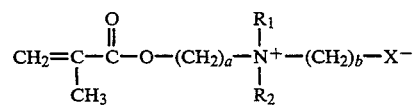

in which $R_1 = C_1-C_2$ alkyl, $R_2 = C_1-C_2$ alkyl, $X^- = SO_3^-$ or $COO^-$, $a = 2-3$, and $b = 1-6$, are polymerized into copolymer latexes for use in paint formulations, in an amount of 1-3 parts per hundred parts by weight of monomers used to form the copolymer, to impart superior wet adhesion and freeze-thaw stability to the latex paints. The copolymer latexes contain no more than one part by weight carboxylic acid functionality per hundred part monomers. The monomers with which the amphoteric surfactants are copolymerized are selected from alkyl esters of acrylic and methacrylic acid, acrylic and methacrylic acid, styrene and mixtures thereof.

6 Claims, No Drawings

THERMOPLASTIC, AQUEOUS LATEX PAINTS HAVING IMPROVED WET ADHESION AND FREEZE-THAW STABILITY

This is a continuation in part of application Ser. No. 08/064,682, filed May 20, 1993, now abandoned, which is a continuation in part of application Ser. No. 07/748,714, filed Aug. 22, 1991, now abandoned, which is a divisional of application Ser. No. 07/537,711, filed Jun. 13, 1990, granted Nov. 12, 1991, as U.S. Pat. No. 5,064,888.

BACKGROUND OF INVENTION

Aqueous latex based paints for both indoor and outdoor architectural paint use possess a number of advantages, such as, low odor, easy clean-up, and fast drying time, over solvent based architectural paints. However, latex paints suffer from the drawback of exhibiting poor wet adhesion and poor freeze-thaw stability.

The term wet adhesion is used in the paint industry to describe the ability of a paint to retain its adhesive bond to a substrate under wet or high humidity conditions. A deficiency of wet adhesion properties limits the utility of latex paints in areas where humid environments might be encountered, for example, exteriors, bathrooms and kitchens. It also makes surfaces painted with latex paints less scrub resistant than those painted with organic solvent based paints.

Latex based paints generally comprise three components: a film forming emulsion polymer or copolymer (the latex), an aqueous phase (which may contain additives as particular applications dictate, such as, pigments, defoamers and antifreeze agents), and one or more surfactants.

The emulsion polymers used in formulating latex paints usually are all-acrylic copolymers comprising alkyl esters of acrylic and methacrylic acid with minor amounts of acrylic and methacrylic acid, or they are vinyl-acrylic polymers comprising vinyl containing monomers or polymers in combination with softer acrylic monomers.

The all-acrylic paints produce hard coatings resistant to scrubbing and provide good water resistance and wet adhesion; but because of the cost of the acrylic monomers, they are expensive. The vinyl-acrylic paints are less expensive and produce films that are hard, but they tend to have a much lower wet adhesion than their acrylic based counterparts.

In recent years improvements in wet adhesion properties have been obtained by the incorporation of amine, amide, and acetoacetate functionalities into the latex polymers. For example, cyclic ureido derivatives have been described in U.S. Pat. Nos. 4,104,220, 4,111,877, 4,219,454, 4,319,032 and 4,599,417 as imparting wet adhesion properties. However, these wet adhesion monomers are very expensive and their inclusion results in a drastic increase in the cost of the vinyl-acrylic polymers and all-acrylic polymers used in the latex based paints.

Latex paints also destabilize on repeated cycles of freezing and thawing. During freeze-thaw cycling the anionic surfactants commonly employed in latex paints tend to desorp from the latex particles, increasing the ionic strength of the aqueous phase and ultimately resulting in paint coagulation. Ordinarily, antifreeze compounds, such as ethylene glycol, are added to the paints to combat the destabilization, but this contributes to the cost of the paint and also results in the use of volatile organic compounds.

Blends of surfactants, such as described in U.S. Pat. No. 3,193,517, have been used in attempts to alleviate this problem. However, the blended system is not entirely satisfactory in other respects and there exists a real need for both wet adhesion promoters and freeze-thaw stabilizers for use in latex paints.

SUMMARY OF THE INVENTION

This invention presents thermoplastic, latex copolymers which comprise amphoteric surfactants and which are suitable as wet adhesion promoters and freeze-thaw stabilizers for use in both all-acrylic and vinyl-acrylic thermoplastic latex paints. In another embodiment, this invention is a method for improving the freeze-thaw stability and wet adhesion of a thermoplastic, aqueous based latex paint formulation that comprises adding to the paint a thermoplastic latex copolymer comprising the polymerization product of the amphoteric surfactant and at least one all-acrylic, vinyl-acrylic or styrene acrylic monomers or mixtures thereof. Preferably, the monomers are selected from the group consisting of alkyl esters of acrylic and methacrylic acid, acrylic and methacrylic acid, styrene and mixtures thereof.

These amphoteric surfactants possess acidic and basic groups within the same molecule and can exist as cationic, amphoteric or anionic species, depending on the pH of solution.

Most substrates exhibit a net negative charge and it is expected that the presence of positively charged nitrogen in the amphoteric surfactant of a paint formulation containing the surfactant results in ionic interaction between the paint coating and the substrate. This helps to enhance the wet adhesion of the latex, especially on glossy alkyd surfaces. The inclusion of amphoteric surfactants in the paint also lowers the demand for the amount of expensive wet adhesion monomer required to build wet adhesion, thereby reducing the overall cost of the paint formulation.

Further, the amphoteric surfactants of this invention produce paints having superior freeze-thaw stability. Due to their zwitterionic character, it is expected that any desorption of these surfactants would not alter the ionic strength of the aqueous phase, and the onset of paint coagulation can therefore be delayed or eliminated entirely.

DETAILED DESCRIPTION OF THE INVENTION

The amphoteric surfactants of this invention are copolymerized into the polymeric chain of the latex copolymer at a concentration by weight of 1-3 parts per hundred parts of the monomers (pphm) used to make the latex copolymer. The surfactants have the structural formula:

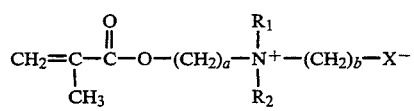

in which
$R_1 = C_1-C_2$ alkyl,
$R_2 = C_1-C_2$ alkyl,
$X^- = SO_3^-$ or $COO^-$,
$a = 2-3$, b=1—6.

While these copolymerizable amphoteric surfactants may be utilized as the only wet adhesion monomer/surfactant in the paint formulation, the inclusion of small amounts of nonionic surfactants of the general formula $$R-O-(-CH_2-CH_2-O)_n-H$$

in which
R = $C_4$-$C_{12}$ alkylphenol, preferably
$C_8$-$C_9$ alkylphenol, or
$C_4$-$C_{18}$ alkyl, preferably
$C_{12}$-$C_{15}$ alkyl, and
n = about 20–50,
into the copolymerization further serves to stabilize the latex emulsion and enhance mechanical stability. The nonionic surfactants are preferably incorporated at a level of 0.5–0.7 pphm by weight.

The monomers with which the amphoteric surfactants are copolymerized may be based on all-acrylic, vinyl acrylic or styrene acrylic monomers. Preferably, the monomers are selected from the group consisting of alkyl esters of acrylic and methacrylic acid, acrylic and methacrylic acid, styrene and mixtures thereof. More preferably, the monomers are selected from the group consisting of $C_1$-$C_4$ alkyl esters of acrylic and methacrylic acid, acrylic acid, styrene and mixtures thereof, and even more preferably, butyl acrylate, methyl methacrylate, acrylic acid, styrene and mixtures thereof.

The latex copolymers must not impart high water sensitivity to the inventive latex paints. Accordingly, the monomers must be selected such that the level of functional groups which impart water sensitivity to the copolymers, such as hydroxyl or carboxyl groups for example, should be kept to a minimum. Specifically, the latex copolymer must contain no more than one part carboxylic acid functionality per hundred parts by weight monomers.

The copolymers containing the amphoteric surfactants can be used with thermoplastic latex paint systems, including vinyl-acrylic and all-acrylic systems, to improve the wet adhesion of the paints, and are especially useful with the vinyl-acrylic formulations. The surfactants also stabilize the paints toward freeze-thaw cycling, permitting the reduction or elimination of any antifreeze agent. Ordinarily paint formulations contain significant amounts of antifreeze, typically ethylene glycol, (5–10% by weight or more). As environmental regulations continue to increase, the demand for paints with low or no volatile organic compounds (VOC) also is increasing. The use of these surfactants will reduce to a low level, <2% by weight, the amount of volatile organics necessary, or even eliminate their need entirely in paint formulations.

EXAMPLES

The following examples illustrate certain preferred embodiments of thermoplastic latex copolymers containing the inventive surfactants for use in thermoplastic, aqueous paint formulations, and the freeze-thaw stability and wet adhesion properties of the paint formulations comprising the latex copolymers. The average particle size diameter of the latex copolymers was determined by a BI-90 particle size analyzer (Brookhaven Instruments).

EXAMPLE I

This example illustrates the preparation of a comparative all-acrylic latex (methyl methacrylate/butyl acrylate) containing a standard wet adhesion monomer, sold under the tradename Sipomer ® WAM (a product of Alcolac Ltd.) and using an anionic surfactant, sodium lauryl sulfate, sold under the tradename Sipex ® UB (a product of Alcolac, Ltd.).

The following reagents, given in parts per hundred parts by weight of monomer (pphm) concentration based on the final formulation, were charged into the identified reaction vessels as follows:

| Compound | Grams | Concentration |
|---|---|---|
| Primary Vessel | | |
| H₂O | 1991 | 59.17 pphm |
| Secondary Vessel I (monomer pre-emulsion) | | |
| Butyl Acrylate (BA) | 1742 | 51.8 pphm |
| Methyl Methacrylate (MMA) | 1623 | 48.23 |
| Water | 654 | 19.43 |
| Siponate DS-10 (sodium dodecyl benzene sulfonate) | | 1.66 |
| Rexol 25/407 (70%) | 88 | 2.61 |
| Secondary Vessel II | | |
| Ammonium Persulfate | 14.0 | 0.42 pphm |
| H₂O | 250 | 7.43 |
| Secondary Vessel III | | |
| H₂O | 100.0 | 2.97 pphm |
| Sipomer WAM | 38.0 | 1.13 |
| Secondary Vessel IV | | |
| H₂O | 300 | 0.9 pphm |
| Sodium meta-bisulfite (SMBS) | 10 | 0.3 |

The contents in the primary vessel were mildly agitated and heated to 55° C. The monomer pre-emulsion, 164 gm, from Secondary Vessel I, and 24 gm of the ammonium persulfate solution from Secondary Vessel II, and 29 gm of SMBS solution from Secondary Vessel IV were then added to the primary vessel. After incubation of the mixture for 10 minutes the remaining contents of secondary vessels I, II, III, and IV were added and the pH of the resultant emulsion was adjusted to 8 by the addition of 26.6% by weight aqueous ammonium hydroxide solution.

The resultant latex copolymer was designated Acrylic B and had a solids content of 50% and an average particle size diameter of 150 nm.

EXAMPLE II

An inventive all-acrylic latex copolymer was synthesized essentially following the procedure in Example I, but employing an amphoteric surfactant of this invention, namely N-(3-sulfopropyl) -N-methacryloxyethyl-N,N-dimethyl ammonium betaine (sold under the tradename Hartomer HB-6380, a product of Hart Chemical, Ltd.). The latex was designated Acrylic K and had the following monomer and surfactant composition by weight in parts per hundred parts of monomer (pphm):

| | |
|---|---|
| Butyl Acrylate | 5.05 pphm |
| Methyl Methacrylate | 48.5 |
| Acrylic Acid | 1.0 |
| Hartomer HB-6380 | 2.2 |
| Rexol 25/40 | 0.6. |

The resulting latex had a particle size of 540 nm, a viscosity of 34 mPa.s (cps), pH 7.0, and a solids content of 51.06%.

A comparative latex copolymer, designated Acrylic L, was made with the same monomer composition of Acrylic K, but employing anionic surfactant Siponate DS-10 instead of the amphoteric surfactant.

EXAMPLE III

Preparation of Thermoplastic Latex Paint Formulations

Paint screening formulas were prepared with the following compositions. Semi-Gloss Paint Screening Formula I

| Compounds | Grams |
|---|---|
| Ethylene Glycol | 81 |
| Colloid 226-35 (1) | 7.5 |
| Drew L-475 (2) | 3.0 |
| Water | 30 |
| Titanox 2020 (3) | 300 |
| Snowhite 10-1 (4) | 50 |
| Disperse to 5-6 Hegman (5) and add: | |
| Water | 265 |
| Methocel J5MS (6) | 2 |
| Latex Copolymer | 530 |
| Rexol 25/9 (7) | 4.0 |
| Texanol (8) | 10.0 |
| AMP-95 (9) | 3.0 |
| UCAR SCT-275 (10) | 25.0 |
| Kathon LX (11) | 3.0 |
| Drew L-475 (2) | 6.0 |

Notes:
1. A non foaming, water soluble anionic dispersant containing 35% of active, and having a pH of 7.5 and specific gravity of 1.23.
2. A defoamer prepared from a blend of mineral oils and silica derivatives containing 100% of active material.
3. Rutile titanium dixoide, also known as Tioxide HD6X.
4. Calcium carbonate having the properties:
$CaCO_3$ - 92.5%
dry brightness - 95.5
specific gravity - 2.65
less than 10 microns - 90%
mean particle size - 3 microns
Hegman grind - 6.5
oil absorption - 16
5. A grind measurement used by the paint industry.
6. Hydroxy propyl cellulose.
7. An ethoxylated nonyl phenol surfactant (nonionic) containing 9 to 10 moles of ethylene oxide.
8. 2,2,4-Trimethylpentanediol-1,3, monoisobutyrate and used as coalescing agent.
9. 2-Amino-2-methyl-1-propanol.
10. A non-ionic water-soluble polyether-polyurethane thickener.
11. A microbiocide having, as active ingredients, 5-chlor-2-methyl-4-isothiazolin-3-one and 2-methyl-4-isothiazolin-3-one and containing 14% active ingredients.

The ingredients were mixed for 15 minutes, after which the formulation was ready for use.

Semi-gloss paint screening formula II was prepared following the recipe of formula I, except that 20 grams of ethylene glycol was used instead of 81 grams of ethylene glycol.

Semi-gloss paint screening formula III was prepared following the recipe of formula I, except that no ethylene glycol was used.

Semi-gloss paint screening formula IV was prepared following the recipe of formula I except that no ethylene glycol or Texanol (coalescing agent) were used.

EXAMPLE IV

Freeze-Thaw Stability Test

Paint compositions were tested for freeze-thaw stability by repeated cycles of freezing and thawing. The paint formulations were subjected to temperatures of −16° C for 18 hours, and were then warmed to room temperature for 8 hours. The cycles were continued until the latex paint coagulated, or to a maximum of five (5) cycles.

EXAMPLE V

Scrub Resistance Wet Adhesion Test

Paint compositions were tested for wet adhesion by the following procedure: Leneta scrub panels were prepared by making a 3-mil drawdown of a standard semi-gloss alkyd base, chosen as being the most difficult base for wet adhesion, onto the panels. The panels were then aged one week at room temperature. At the end of the week, the test latex paints were drawn down on the aged alkyd surfaces using a 3-mil bird applicator and allowed to dry for 48 hours.

A scrub brush for use in a scrub machine was immersed in warm water for 30 minutes to be conditioned before scrubbing the test panels. The test panels were affixed to a glass panel and put into 200 gm of water in the water box of the scrub machine. The brush was positioned in the scrub machine over the test panels and activated to scrub the panels for 400 strokes. If the coating remained intact, 8 gm dry Ajax ® were then placed on the test panel and under the brush, and the machine was run 100 strokes. This step was repeated until the coating failed, that is, when the latex paint stripped from the alkyd. The number of brush scrubs to achieve failure was recorded and used to determine wet adhesion properties.

EXAMPLE VI

Freeze-Thaw Stability/No Ethylene Glycol

Acrylics K and L were tested for freeze-thaw stability in semi-gloss paint screening formulation III containing no ethylene glycol. The paint formulation containing Acrylic K with copolymerizable amphoteric surfactant remained liquid after 5 cycles exhibiting good freeze-thaw stability, even without ethylene glycol. The paint formulation containing Acrylic L with anionic surfactant Siponate DS-10 instead of the amphoteric surfactant coagulated after one cycle.

EXAMPLE VII

Freeze-Thaw Stability/Ethylene Glycol

An inventive all-acrylic latex, designated Acrylic M, was synthesized using the amphoteric copolymerizable surfactant N-(aceto)-N-methacryloxyethyl-N,N-dimethyl ammonium betaine (sold under the tradename Hartomer HB-6420, a product of Hart Chemical, Ltd.) as in Example II. The resultant latex had a solids content of 51.8%, a particle size of 471 nm, pH 5.0, and a grits (200M) residue of 0.13.

Acrylic M was formulated into semi-gloss paint screening formulation III containing no ethylene glycol and tested for freeze-thaw stability. Acrylic M exhibited no coagulation after five cycles.

A comparative all-acrylic latex, designated Acrylic N, was synthesized employing the anionic copolymerizable surfactant which is the sodium salt of allyl ether sulfonate (a product of Alcolac Ltd.) in place of the copolymerizable amphoteric surfactant of Acrylic M. The resultant latex had a solids content of 52.6%, a particle size of 533 nm, a grits (200M) residue of 0.006.

Acrylic N was formulated into semi-gloss paint screening formulation I containing ethylene glycol and tested for freeze-thaw stability. Acrylic N coagulated after two cycles.

EXAMPLE VIII

A comparative all-acrylic latex, designated Acrylic O, was synthesized using the cationic copolymerizable surfactant methacrylamidopropyl-trimethyl ammonium chloride in place of the copolymerizable amphoteric surfactant of Acrylic K. The resulting latex had a solids content of 49.5%, a particle size of 302 nm, pH 7.0, viscosity 38 mPa.s (cps), and a grits (200M) residue of 0.0013.

Acrylic O was formulated into semigloss paint formula II containing ethylene glycol and tested for freeze-thaw stability. It coagulated during the first cycle, demonstrating that the paints formulated with the amphoteric copolymerizable surfactants of this invention exhibit superior freeze-thaw stability compared to those using copolymerizable cationic surfactants.

EXAMPLE IX

Styrene-Acrylic Latex

Using the copolymerizable amphoteric surfactant monomer Hartomer HB-6380, an inventive styrene-acrylic latex designated Styrene-Acrylic P was synthesized with the following monomer and surfactant composition in pphm:

| Styrene | 15.0 pphm |
| --- | --- |
| Butyl Acrylate | 53.5 |
| Methyl Methacrylate | 30.7 |
| Acrylic Acid | 1.0 |
| Hartomer HB-6380 | 2.2 |
| Rexol 25/40 | 0.6. |

The resultant latex had a solids content of 52.3%, an average particle size of 351 nm and a viscosity of 30.0 mPa.s (cps).

Styrene-Acrylic P was tested for freeze-thaw stability in semigloss paint formula III containing no ethylene glycol. The paint showed no sign of coagulation after 5 freeze-thaw cycles.

EXAMPLE X

No Ethylene Glycol, No Coalescing Agent

Using Hartomer HB-6380, a film forming all-acrylic emulsion designated Acrylic Q was synthesized with the following composition in pphm:

| Butyl Acrylate | 53 pphm |
| --- | --- |
| Methyl Methacrylate | 45.5 |
| Acrylic Acid | 1.0 |
| Hartomer HB-6380 | 2.2 |
| Rexol 25/40 | 1.1. |

The resultant inventive latex had a solids content of 53.0%, pH 7.0, a particle size of 351 nm. Acrylic Q was formulated into semigloss paint formula IV in which no ethylene glycol and no Texanol (coalescing solvent) were added to furnish a solventless paint composition. The paint was tested for freeze-thaw stability and scrub resistance and compared to Acrylic B, a standard formula latex. The following results were obtained:

| Acrylic | Q | B |
| --- | --- | --- |
| Surfactant | HB-6380 | Siponate DS-10 |
| freeze-thaw cycles | 5 | 1 |
| Wet Adhesion | 2552 | 1300 |
| (scrubs to failure) | | |

This example shows that solventless paint made with Acrylic Q showed superior freeze-thaw stability and scrub resistance as compared to the same paint made with Acrylic B using a conventional surfactant.

COMPARATIVE EXAMPLE XI

A styrene-acrylic latex was made following the polymerization procedure disclosed in Reference Example 4 of U.S. Pat. No. 4,140,664 and using a polymerizable amphoteric surfactant, specifically, N-methacryloxyethyl N,N-dimethyl ammonium betaine structure I as disclosed in that reference. The latex had the following monomer composition in parts per hundred parts monomer:

| Initiator | |
| --- | --- |
| Azobiscyanovaleric Acid | 2 pphm |
| Monomers | |
| 2-Hydroxy ethyl acrylate | 10 |
| Styrene | 26.4 |
| Methyl methacrylate | 26.4 |
| N-butyl acrylate | 35.2 |
| N-methacryloxyethyl-N,N-dimethyl ammonium betaine | 2.0. |

The resultant latex was designated Styrene-Acrylic R and had a solids content of 44.4% and a particle size of 331 nm.

Styrene-Acrylic R was tested in semigloss paint formula III containing no ethylene glycol for freeze-thaw stability and wet adhesion properties (number of scrubs to failure). Styrene-Acrylic R passed 5 freeze-thaw cycles and 200 scrubs at failure. Comparing the number of freeze-thaw cycles and scrubs to the 2552 scrubs obtained with Latex Q in Example X shows that Styrene-Acrylic R has good freeze-thaw stability, but poor wet adhesion. Both of these properties can be attributed to the hydrophilic nature of the polymer resulting from four times the number of carboxylic acid functional groups present on the polymer from the polymerizable initiator, azobiscyanovaleric acid, compared to those in Stryene-Acrylic Q. Azobiscyanovaleric acid contains two carboxylic acid functionalities per molecule and is present in an amount of 2 pphm; Styrene-Acrylic Q, contains one carboxylic acid functionality per molecule from the acrylic acid monomer, which is present in an amount of 1 pphm.

We claim:

1. A thermoplastic latex copolymer comprising the polymerization product of:
   at least one monomer selected from the group consisting of alkyl esters of acrylic acid and methacrylic acid, acrylic and methacrylic acid, styrene and mixtures thereof; and
   a copolymerizable amphoteric surfactant at a concentration of 1–3 parts per hundred parts monomers by weight, said amphoteric surfactant having the structural formula:

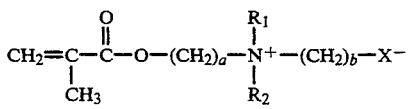

in which
R$_1$ = C$_1$-C$_2$ alkyl,
R$_2$ = C$_1$-C$_2$ alkyl,
X$^-$ = SO$_3^-$ or COO$^-$,
a = 2-3,
b = 1-6;

said copolymer having no more than one part by weight carboxylic acid functionality per hundred parts monomers.

2. The latex copolymer of claim 1 wherein the monomers are selected from the group consisting of C$_1$-C$_4$ alkyl esters of acrylic and methacrylic acid, acrylic acid, styrene and mixtures thereof.

3. The latex copolymer of claim 2 wherein the monomers are selected from the group consisting of butyl acrylate, methyl methacrylate, acrylic acid, styrene and mixtures thereof.

4. The latex copolymer of claim 1 further comprising at least one nonionic surfactant having the formula:

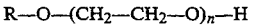

wherein R = C$_4$-C$_{12}$ alkylphenol or C$_4$-C$_{18}$ alkyl; and n is about 20-50.

5. An aqueous, thermoplastic latex paint comprising the copolymer of claim 1.

6. The latex paint of claim 5 wherein the latex copolymer further comprises at least one nonionic surfactant having the formula:

wherein R = C$_4$-C$_{12}$ alkylphenol or C$_4$-C$_{18}$ alkyl; and n is about 20-50.

* * * * *